March 19, 1968
G. KRIKORIAN
3,373,875
APPARATUS FOR SCREENING PULP
Filed June 1, 1965
3 Sheets-Sheet 3
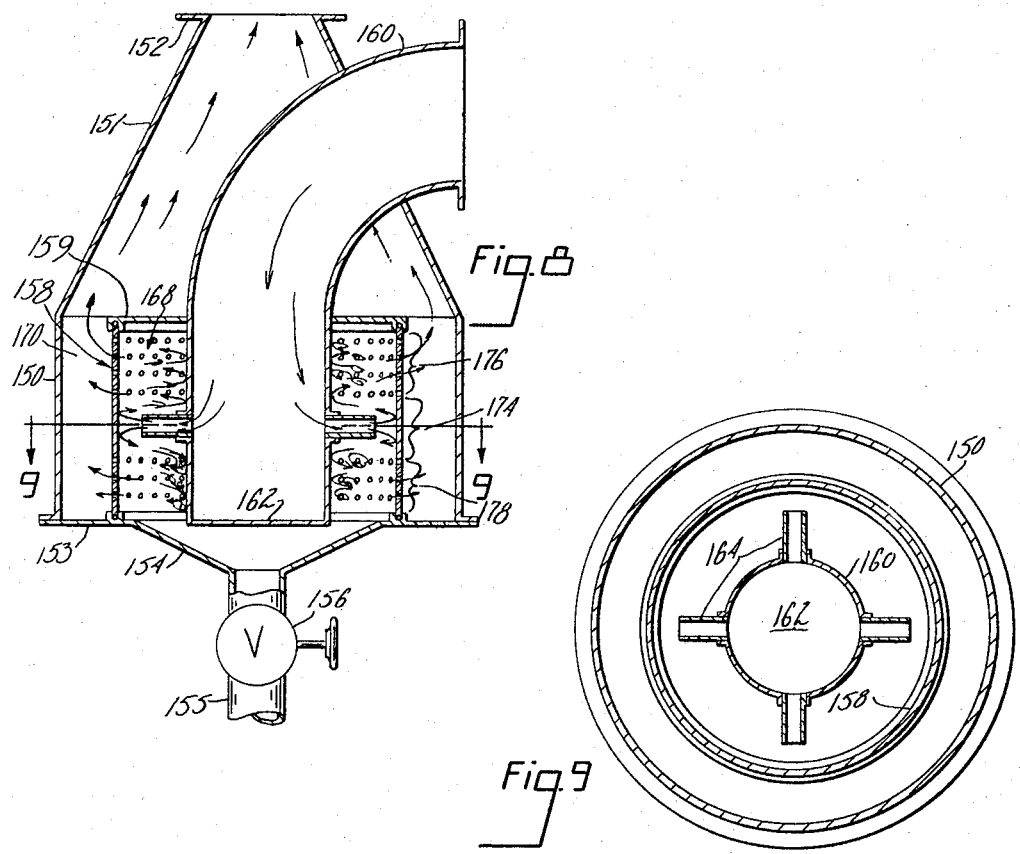

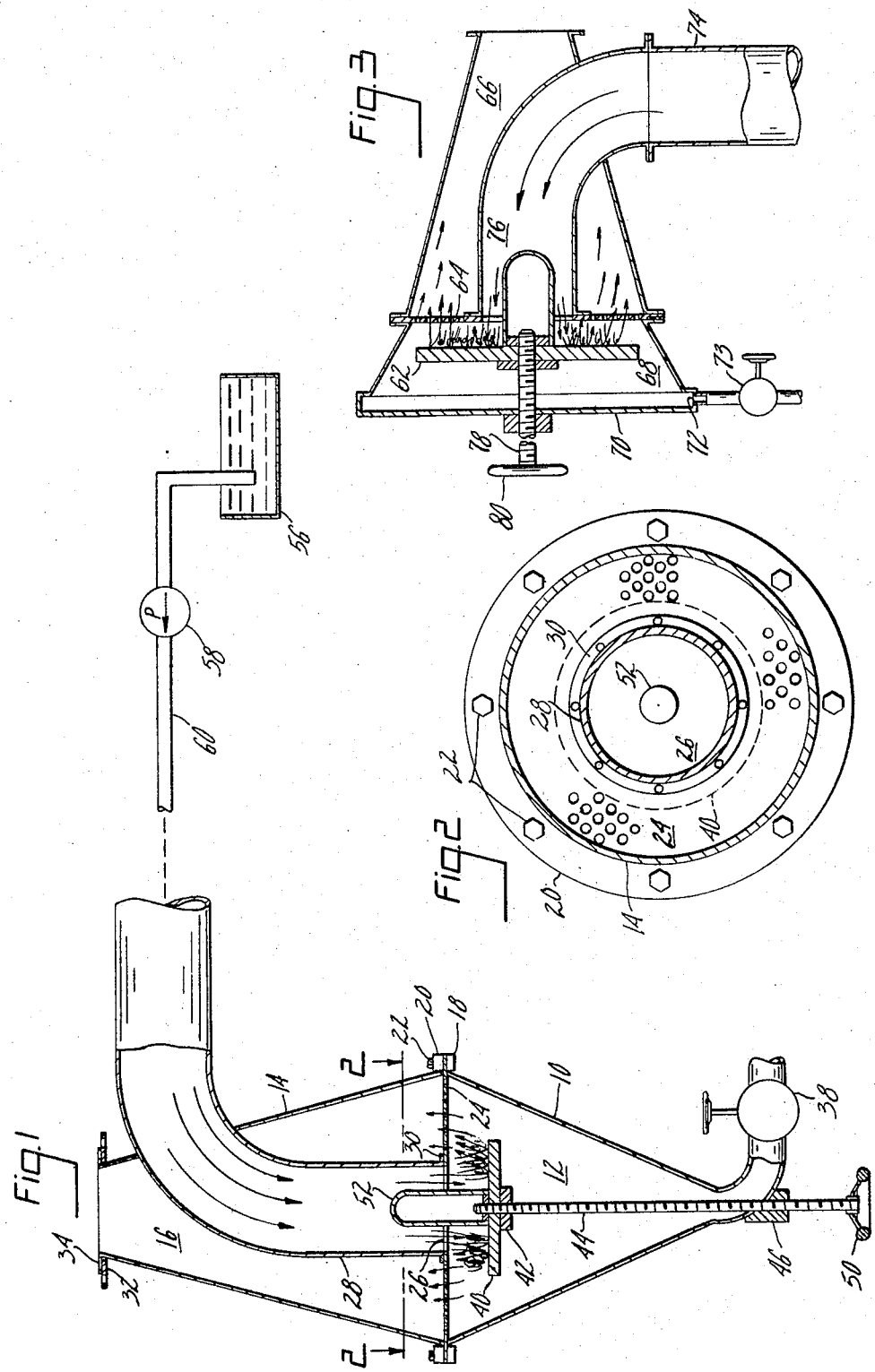

United States Patent Office 3,373,875
Patented Mar. 19, 1968

3,373,875
APPARATUS FOR SCREENING PULP
Garo Krikorian, Paxton, Mass., assignor to Rice Barton Corporation, Worcester, Mass., a corporation of Massachusetts
Filed June 1, 1965, Ser. No. 460,252
2 Claims. (Cl. 210—305)

The present invention relates to an improved apparatus for screening pulp.

It is a further object of the invention to provide a pulp improved apparatus for screening out impurities, for deflocking, and for generally improving the quality of the pulp flow in paper making and similar processes.

It is a further object of the invention to provide a pulp screening device for use in paper making and similar operations which is simple and of relatively low cost comprising generally a pulp flow channel, a screen in said channel providing upstream and downstream flow areas at opposite sides of said screen and a novel construction and arrangement of relatively fixed parts in said upstream flow area which will condition the slurry most efficiently for passage through the screen.

With these and other objects in view as may hereinafter appear, the several features of the invention will be readily understood by one skilled in the art from the following description taken in connection with the accompanying drawings in which:

FIG. 1 is a view in side elevation illustrating in a preferred form my improved apparatus for screening pulp, the parts being shown mostly in section along the maximum diameter of the screen filter, a supply reservoir, pump and connecting line being shown on the reduced scale;

FIG. 2 is a plan section on a line 2—2 of FIG. 1 illustrating particularly the screen, a centrally located inlet aperture therethrough, and the underlying anvil plate;

FIG. 3 illustrates a modified form of my screen filter in which the upstream slurry is directed against the impact surface of a baffle plate disposed in a vertical plane and in which the rejects unable to pass through the screen are collected and withdrawn adjacent the lower edge of said plate;

Figure 4:
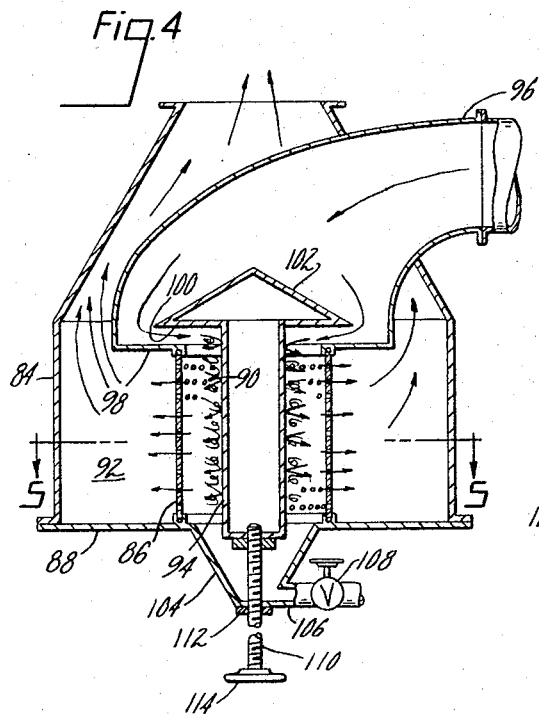
FIG. 4 illustrates a further modification of my screen filter in which the incoming slurry is directed against a cylindrical impact surface and thence radially outwardly against an overlying adjacent screen.

FIG. 8 illustrates a further modification of the invention in which the pulp slurry is directed through a series of nozzles outwardly against a cylindrical element having an impact surface and screen areas adjacent thereto, and an inner cylindrical element providing upstream area bounding surfaces directing the flow of turbulent slurry directly through said screen area; and FIG. 9 is a sectional plan view taken on a line 9—9 of FIG. 8.

My improved screen filter comprises generally a housing providing therein a pulp slurry flow channel, and a screen interposed in said channel providing upstream and downstream flow areas at opposite sides of said screen. The pulp slurry is projected into the upstream flow area against an impact surface so that a change in direction of flow is effected against the incoming slurry producing turbulence. The impact surface and screen are preferably located in closely adjacent relation.

The enclosing surfaces of the upstream flow area including the impact surface referred to are so arranged with relation to the screen as to direct the flow of the slurry while in a condition of turbulence evenly over the entire area of the screen and through the screen. In order that this flow may be as direct as possible from impact area to the screen the enclosing surfaces of the upstream flow area are arranged so that the flow of turbulent slurry is confined to a relatively shallow area.

In the apparatus and method of the present invention the impact producing a change in direction of flow and interference and more especially the turbulence set up are relied upon to break up fiber clusters and to stir the slurry into a thoroughly separated smoothly flowing mass. This turbulence when concentrated against the face of the screen produces a sort of scrubbing action which effectively prevents caking or clogging of the screen during use for extended periods. To further insure an optimum condition of turbulence of the slurry over the face of the screen combined with a strong flow of the slurry through the screen, I have found that the total flow area provided by the outlet conduit from the downstream flow area of the housing must be larger than the total area of the inlet aperture or apertures through which the slurry is projected into the upstream area against the impact surface or surfaces. In each of the embodiments of the invention herein disclosed, provision is made within the upstream area of the housing for a sump within which are collected the various rejects which cannot be passed through the screen.

Referring more particularly to the drawings the pulp screen apparatus illustrated in a preferred form in FIGS. 1 and 2 in accordance with the invention comprises a downwardly and inwardly tapered conical housing element 10 providing therein a lower upstream flow area 12 of the apparatus, and adjacent thereto an abutting upwardly and inwardly tapered conically-shaped housing element 14 which forms an upper downstream flow area 16 of the apparatus. The abutting edges of the lower and upper housings respectively are formed with circumferential rings 18 and 20 which are bolted together by screw bolts 22. A flat screen 24 secured between the two rims 18 and 20 separates the lower upstream flow area 12 from the upper downstream flow area 16. The central portion of the screen 24 is cut away to form an aperture 26. A large inlet conduit 28 extends inwardly through the side of the upper housing element 14 and downwardly to the screen 24 where it is fitted by means of a ring 30 into the aperture 26. The upper housing 14 is provided at its reduced upper end with a circular fitting 32 to which is attached a suitable pipe connection 34 through which the screened slurry is drawn off. A gate 38 is fitted to the reduced lower end of the housing element 10 for the removal of the tailings collected in the lower upstream flow area 12.

In my preferred filter screen construction of FIG. 1 there is also provided a baffle plate 40 located in a plane parallel to and immediately beneath the apertured portion 26 of the screen 24. The anvil plate 40 is secured by means of a fitting 42 to the upper end of a supporting and adjusting screw 44 which is threaded through a base support 46 for the filter unit and extends upwardly along the axis of the conically-shaped lower housing element 10. A hand wheel 50 attached to the lower end of the screw support 44 provides a convenient means of effecting an accurate adjustment of the baffle plate 40 toward and away from the underside of the screen 24 and aperture 26.

The baffle plate 40 is of substantially larger diameter than the aperture 26, so that the turbulence produced by the impact of the slurry against the plate 40 may be directed more evenly over the entire area of the screen 24 through which the slurry is discharged from the lower chamber. The edge of the baffle plate 40 is spaced from the sides of the lower chamber 10.

The flow velocity of the pulp slurry into the upstream flow area against the surface of the impact plate 40 may be regulated by means of a plug 52 which is formed with a screw threaded aperture to receive the upper end of the adjusting screw 44. It will be understood that plugs 52 of different diameters may be mounted in this manner on the upper surface of impact plate 40 to project within the inlet conduit, thus varying the flow velocity for a required rate of volume through the inlet conduit, and consequently regulating the intensity of turbulence in the upstream flow area. Under some sets of operating conditions optimum results may be obtained without the plug 52.

The pulp flows into the inlet conduit 28 from a slurry reservoir 56 through connections which include a rotary pump 58 of ordinary description and a connecting pipe line 60.

My improved screen filter above described, and as shown in the accompanying drawing, operates in the following manner, having reference specifically to FIGS. 1 and 2:

Slurry containing the usual impurities including flocks or clusters of unseparated fibers, oversized fibers, sticks of wood and the like, flows into the screening apparatus through inlet conduit 28 at a pressure of between .2 and 20 pounds per square inch. Inlet velocity is between 5 and 50 ft. per second.

The slurry is directed against the impact surface of the baffle plate 40 located parallel to and adjacent the upstream side of the screen 24. At this point the direction of flow is reversed upon itself and is now upwardly through the screen 24. This abrupt change in direction accompanied by the resulting interference with the flow of the incoming slurry produces turbulence in the slurry at the upper level of the lower chamber 12 immediately beneath the horizontally disposed screen 24. This turbulent condition of the slurry tends to break up any fiber clusters and to separate out any solids which may be present in the slurry. Any tailings in the slurry, defined as any unwanted solids, are driven off over the edges of the impact plate 40 and tend to settle to the bottom of the conically shaped lower chamber 12. The effect of the turbulence produced in the manner described along the upstream side of the screen has been found to effectively break up and to separate any fiber flocks or clusters, and to prevent any accumulation or felting of such material on the screen, so that a continuous unimpeded flow of the slurry is maintained at this point. I have noted further that the apparatus is equally efficient for any rate of flow of the slurry from very low up to a reasonable maximum which would be produced by a pressure head in the neighborhood of 20 or more pounds per square inch passing through an inlet pipe which may be 8 or 10 inches in diameter. It will be noted further that the inwardly tapered sides of the upper downstream flow area 14 have the effect of beneficially regulating the continued flow of the slurry, which is again restricted to a pipe which may be in the order of 8 or 10 inches in diameter without any tendency for the flocks or clusters to reform.

Rejects or tailings collected in the sump provided in the lower end of the chamber 10 may be drawn off by the opening of a gate valve 38.

FIG. 3 illustrates a modified form of my screen filter in which the flow of slurry through the filter is horizontal being directed against the impact surface of a circular anvil plate 62 disposed vertically parallel to and adjacent a vertically disposed filter screen 64.

The screen filter housing comprises a conically shaped outlet downstream housing element 66 having the base end thereof attached to the downstream side of the screen 64, an upstream housing element 68 having the shape of a truncated cone of which the smaller end is attached to the upstream side of the screen 64. The base end of the upstream housing element 68 is formed with a wall 70, and at the outer edge thereof with an annular sump 72 in which are collected any rejects, or tailings which will include oversize fibers, sticks of wood and the like. This area may be cleaned by means of a drainage valve 73 of ordinary description.

Slurry flows into the upstream flow area provided by the upstream housing 68 through an inlet pipe 74 which passes through the wall of the downstream housing 66 and terminates in an aperture 76 centrally located in the screen 64. Slurry flowing into the upstream inlet chamber 68 strikes the impact surface of the circular baffle plate 62 producing a reversal of flow and considerable turbulence of the slurry which flows outwardly so that the turbulent portion of the slurry spreads evenly over and then passes through the screen 64. In order that the distance between the baffle plate 62 and the screen 64 may be adjusted to secure the greatest possible separating and mixing effect upon the slurry at the exact moment that it is passing through the screen and also to produce an even distribution of the turbulence over the entire screen surface the baffle plate is mounted on the inner end of an adjusting bolt 78 screw threaded through the back wall 70 and provided at its outer end with a manual controller 80. The effective area of the outlet aperture 76 may be reduced to control the velocity of slurry flowed into the upstream flow area of the screen filter housing by means of a cylindrical plug which is threaded onto the upper end of adjusting bolt 78 overlying the central portion of baffle plate 62 and projecting upwardly into the inlet pipe 74.

Figure 5:
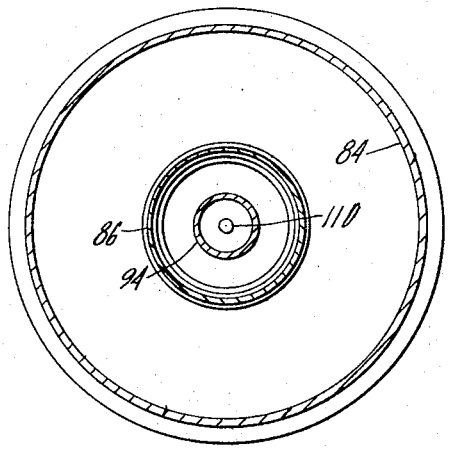
FIG. 5 is a plan section of the screen filter illustrated in FIG. 4 taken on a line 5—5 of FIG. 4.

FIGS. 4 and 5 of the drawings illustrate a modification of my improved screen filter in which the slurry flows into the inlet chamber against the cylindrically shaped impact surface of a metal cylinder, so that a considerable degree of turbulence is set up against the upstream side of a cylindrical screen disposed outwardly of the cylindrical impact surface in concentric parallel relation thereto. The screen filter illustrated in FIGS. 4 and 5 comprises a filter housing of generally cylindrical shape including an outer shell 84 the upper portion of which is tapered to form the downstream outlet 86 from the housing. A cylindrical screen 86 secured at its lower end to a bottom plate 88 of the housing divides the housing into an inner upstream flow area 90 and outer downstream area 92. A centrally located cylinder 94 provides an inner wall of the upstream flow area 90 which is spaced from and parallel to the cylindrical screen 86. The surface of cylinder 94 acts as an impact surface to reverse the flow of the slurry in which a state of turbulence has been created directly through the screen 86.

An inlet conduit 96 having an expanded inner end passes through the tapered upper end of the outer shell 84 and is formed at its inner end with an inwardly extending flange 98 which is attached to the upper end of the cylindrical screen 86. The cylinder 94 is formed at its upper end with a radial flange 100 which is spaced about the flange 98 and is provided with a conically shaped cover 102 causing the inflowing slurry to pass outwardly around the cover 102 and then radially inwardly against the cylindrical impact surface provided by the cylinder 94. The flow of slurry is sharply reversed upon impact with the cylindrical impact surface of the cylinder 94, creating a condition of turbulence. The flow turbulent slurry guided by the cylindrical surface of cylinder 94 now spreads out over and is directed through the screen 86. Any rejects will be collected in the V-shaped sump 104 formed in the bottom plate 88. An exhaust connection 106 with the sump and gate valve 108 are provided to permit easy removal of any said rejects when so desired.

The flow velocity of the slurry against the impact surface of cylinder 94 is controlled by a vertical adjustment of the cylinder 94 by means of which the inflow aperture or nozzle between the flanges 100 and 98 is narrowed or widened. The cylinder 94 is mounted on the upper end of a screw threaded rod 110 supported in a nut 112 provided in the bottom of the sump 104. A hand wheel 114 attached to the lower end of the rod 110 provides a convenient means for rotatably adjusting the rod 110.

Figure 6:
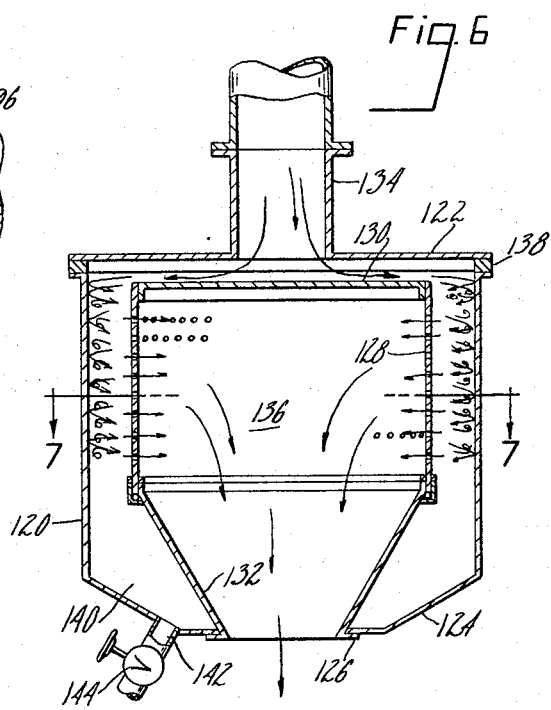
FIG. 6 illustrates another embodiment of my invention in which the incoming slurry is directed downwardly and then outwardly against an inner impact face of a cylindrical baffle member and thence inwardly through an underlying adjacent cylindrical screen.
Figure 7:
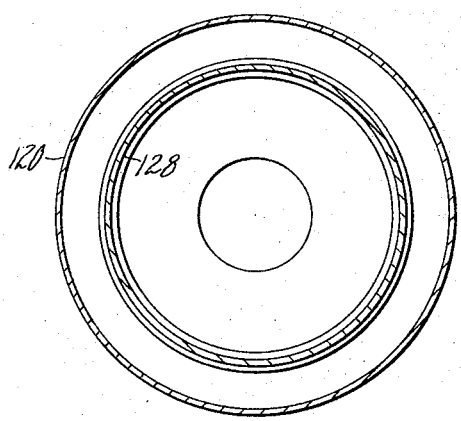
FIG. 7 is a section plan view of the modified filter screen shown in FIG. 6 taken on a line 7—7 of FIG. 6.

FIGS. 6 and 7 of the drawings illustrate a modification of my screen filter which comprises a housing having a cylindrical screening element for screening slurry, upstream and downstream flow areas arranged respectively outwardly and inwardly of said cylindrical screen, and a cylindrical baffle comprising an impact surface extending around said screen externally of and in adjacent parallel relation thereto.

In this form of my screen filter the filter housing 120 is cylindrical in shape, closed at its upper end by a flat cover plate 122 and at its lower end formed with a tapered portion 124 terminating in a slurry outlet fitting 126. Inwardly of the cylindrical housing 120 there is provided a cylindrical screen 128 closed at its upper end by a circular plate 130 and at its lower end having an inwardly tapered portion 132 joined to the tapered lower end 124 of the housing 120 at the location of the outlet fitting 126. Pulp slurry flows into the filter housing 120 through an inlet pipe 134 connected with a central aperture in the cover plate 122, and is directed radially outwardly through a shallow flat passageway formed between the cover plate 122 and the plate 130 overlying the screen 128 against an impact surface formed by the inner face of the cylindrical housing 120. The flow of the slurry is reversed upon impact against the inflowing slurry creating a condition of turbulence and causing the turbulent slurry to flow evenly over the entire area of the screen and through the screen into the downstream flow area indicated at 136 and thence outwardly through the outlet fitting 126. The flow velocity of the slurry against the impact surface provided by the inner face of the cylindrical housing 120 is adjusted by raising or lowering the level of the cover 122. To this end a spacer ring 138 of a desired thickness is inserted between the cover 122 and the upper edge of the cylindrical housing 120 thereby moving the cover 122 toward or away from the plate 130 to narrow or enlarge the nozzle opening as may be desired.

In the embodiment shown in FIGS. 6 and 7 any rejects which may appear will settle into the sump 140 formed between the tapered portion 124 of the screen filter housing 120 and the tapered support 132 for the screen 128. Any such rejects may be drawn off through an exhaust conduit 142 and gate valve 144.

FIGS. 8 and 9 of the drawings illustrate another embodiment of the invention of the general type comprising a housing providing a pulp slurry flow channel in which there is mounted a filter screen providing upstream and downstream flow areas at opposite sides of said screen. This embodiment of the invention differs from those previously considered in that the slurry inlet nozzle or nozzles, and the impact surface against which the slurry is directed, are located in a different relationship to the screen through which the turbulent slurry is subsequently directed. In this form of the device the impact surface is located beside the screen area rather than opposite as in the previous constructions. The flow of the slurry driven against the impact surface is deflected causing interference with the incoming slurry producing a condition of turbulence which is maintained as the slurry strikes against the opposed inner enclosing surface of the upstream flow area, causing another change of direction of flow at the screen.

Referring specifically to the drawing FIGS. 8 and 9 the screen filter assembly comprises a cylindrical filter housing 150 having an inwardly tapered portion 151 which terminates in a downstream slurry outlet 152. The bottom of the housing is formed by means of an inwardly extending flange 153 to the inner edge of which is attached a cone shaped extension 154 providing a sump for rejects. The cone extension 154 is provided with an exhaust connection 155 and gate valve 156 through which rejects can be drawn off from the assembly. The flange 153 provides support for a separating cylinder 158 which divides the flow channel of the apparatus into respective upstream and downstream flow areas. A cover 159 closes the upper end of the screen cylinder 158. This apparatus is also provided with a pulp screen inlet conduit 160 which passes through the tapered portion 151 of the housing, through a central aperture in the cover 159, and then downwardly within the separating cylinder 158 and concentrically placed outer wall of the housing 150. The inlet conduit 160 is closed off at its lower end as indicated at 162. In the illustrated construction four nozzles 164 are provided which project outwardly from the inlet conduit 160 at evenly spaced surfaces about the periphery thereof. The arrangement is such that the upsteam and downstream areas take the form respectively of an inner jacket shaped flow area 168 which surrounds the downwardly extending portion of the inlet conduit 160, and an outer jacket shaped flow area 170 which is separated from the inner jacket by the separating cylinder 158. The separating cylinder 158 is formed with a solid centrally located peripheral section 174 which provides an impact surface against which the incoming slurry is directed by the nozzles 164. Above and below the peripheral section 174 are additional peripheral areas 176 and 178 which are perforated to form screens through which the slurry is passed from the upstream flow area to the downstream flow area of the filter unit.

The screen filter of FIGS. 8 and 9 operates as follows: The pulp slurry forced through the nozzles 164 is driven against the impact surface provided by the centrally located peripheral section 174 of the cylinder 158 causing the direction of flow to be sharply diverted to produce interference and turbulence in the slurry in and about this impact area. The slurry thus placed in a condition of turbulence is confined within the relatively narrow upstream flow area of the apparatus provided between the separating cylinder 158 and the external wall of the cylindrical infeed conduit 160 which acts also as an impact surface causing the turbulent slurry to be directed through the screen areas 176 and 178 into the downstream flow area 170. Any rejects which may appear will find their way downwardly into the sump 154, from which they may be periodically removed through the valve 156 and exhaust connection 155.

The invention having been described, what is claimed is:

1. A liquified pulp screening apparatus having, in combination, a housing providing therein a pulp slurry flow channel, a screen interposed in said channel, said housing providing at one side of said screen an upstream flow area and above said screen a downstream flow area, a baffle disposed within said upstream flow area having an impact face adjacent and underlying said screen and having the edges thereof spaced from said housing providing egress for rejects below said baffle, an adjustable support on which the baffle is adjustable toward and away from the screen, and a pulp slurry inlet conduit extending through a central portion of said screen having an orifice directing inflowing slurry directly against said impact face thereby diverting the flow against the inflowing slurry producing turbulence and a flow of said turbulent slurry over the screen area and through the screen.

2. A pulp screening apparatus according to claim 1 in which a plug is mounted on said baffle plate, extending upwardly into said orifice to control the flow velocity of said slurry through the orifice.

References Cited

UNITED STATES PATENTS

| | | | |
|---|---|---|---|
| 1,197,634 | 9/1916 | Hull | 210—305 |
| 3,174,622 | 3/1965 | Lamort | 209—273 |
| 3,243,041 | 3/1966 | Cowan | 209—273 |

FOREIGN PATENTS 653,041    5/1951    Great Britain.

SAMIH N. ZAHARNA, *Primary Examiner.*

REUBEN FRIEDMAN, *Examiner.*

J. DE CESARE, *Assistant Examiner.*